United States Patent
Sharma et al.

(10) Patent No.: US 11,150,931 B2
(45) Date of Patent: Oct. 19, 2021

(54) VIRTUAL WORKLOAD MIGRATIONS

(71) Applicant: Hewlett Packard Enterprise Development LP, Houston, TX (US)

(72) Inventors: Ranjeet Kumar Sharma, Bangalore (IN); Anusha Kadambala, Bangalore (IN); Raja Sekhar Reddy Juturu, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 108 days.

(21) Appl. No.: 16/174,571

(22) Filed: Oct. 30, 2018

(65) Prior Publication Data

US 2020/0133702 A1    Apr. 30, 2020

(51) Int. Cl.
  *G06F 9/455*  (2018.01)
  *G06F 9/50*   (2006.01)
  *G06F 9/48*   (2006.01)

(52) U.S. Cl.
  CPC ........ *G06F 9/45558* (2013.01); *G06F 9/4856* (2013.01); *G06F 9/505* (2013.01); *G06F 9/5088* (2013.01); *G06F 2009/4557* (2013.01); *G06F 2009/45591* (2013.01)

(58) Field of Classification Search
  None
  See application file for complete search history.

(56) References Cited

U.S. PATENT DOCUMENTS

| 8,850,434 B1 * | 9/2014 | Butikofer | G06F 9/5088 |
| | | | 718/1 |
| 9,336,030 B1 * | 5/2016 | Marr | G06F 9/5077 |
| 9,606,840 B2 | 3/2017 | Schaad | |

(Continued)

FOREIGN PATENT DOCUMENTS

| WO | WO-2013185175 | 12/2013 | |
| WO | WO-2016134542 A1 * | 9/2016 | ............... G06F 9/50 |
| WO | WO-2017010922 | 1/2017 | |

OTHER PUBLICATIONS

Choudhary et al., "Improved Virtual Machine migration approaches in Cloud Environment", 2016, IEEE International Conference on Cloud Computing in Emerging Markets, pp. 17-24. (Year: 2016).*

(Continued)

*Primary Examiner* — Kenneth Tang
(74) *Attorney, Agent, or Firm* — Brooks, Cameron & Huebsch, PLLC (57) ABSTRACT

An example system including a plurality of computing resources, distributed across a plurality of hosts, to execute virtual workloads; and a computing device, communicatively coupled to the plurality of hosts, comprising a processing resource and a memory resource. The memory resource may store instructions executable by the processing resource to monitor utilization data of the plurality of computing resources executing assigned respective virtual workloads; predict a destination host from the plurality of hosts with available computing resources in an amount to accommodate a predicted resource utilization of a particular virtual workload based on the monitored utilization data of the plurality of computing resources; and migrate the particular virtual workload assigned to a source host of the plurality of hosts to the destination host to be executed.

19 Claims, 5 Drawing Sheets

(56) References Cited

U.S. PATENT DOCUMENTS

| | | | | |
|---|---|---|---|---|
| 2010/0191854 | A1* | 7/2010 | Isci | G06F 1/3203 709/226 |
| 2011/0145380 | A1* | 6/2011 | Glikson | G06F 9/4856 709/223 |
| 2011/0282982 | A1* | 11/2011 | Jain | G06F 9/5094 709/223 |
| 2012/0174104 | A1* | 7/2012 | Neogi | G06F 9/45558 718/1 |
| 2013/0227131 | A1* | 8/2013 | Ashok | H04L 67/1031 709/224 |
| 2013/0268940 | A1* | 10/2013 | Gmach | G06F 9/5077 718/104 |
| 2014/0082612 | A1 | 3/2014 | Breitgand et al. | |
| 2015/0178120 | A1* | 6/2015 | Prasek | G06F 1/28 718/1 |
| 2015/0365297 | A1 | 12/2015 | Bogdany et al. | |
| 2017/0199564 | A1* | 7/2017 | Saxena | G06F 9/45558 |
| 2018/0102985 | A1* | 4/2018 | Byers | H04L 47/823 |
| 2020/0004582 | A1* | 1/2020 | Fornash | H04L 67/1097 |
| 2020/0104189 | A1* | 4/2020 | Gopalan | G06F 9/5088 |

OTHER PUBLICATIONS

Xu et al., English translation of WO 2016/134542 A1, Feb. 28, 2015, IP.com, pp. 1-24.*

Red Hat, "Resource Management Guide", Resource Management Guide, 2018, 36 pages.

Technical Marketing Documentation, "Vmware Vcloud Director Resource Allocation Models ", V 1.0/updated Aug. 2012, 42 pages.

Biswas, A. et al., Automatic Resource Provisioning: a Machine Learning Based Proactive Approach, (Research Paper), Feb. 12, 2015, 4 Pgs., Published in: 2014 IEEE 6th International Conference on Cloud Computing Technology and Science.

* cited by examiner

VIRTUAL WORKLOAD MIGRATIONS

BACKGROUND

Computing resources, such as a central processing unit (CPU), random access memory (RAM), and storage, of a computing system may be utilized to execute computing operations. Computing resources may be partitioned into and accessed through virtualization instances such as Virtual Machines (VMs) and/or containers. Virtual workloads may be virtual machines (VMs) and/or containers and/or their corresponding computational operations able to be assigned to corresponding computing resources for execution.

DETAILED DESCRIPTION

Virtual workloads may include virtual machine (VM) and/or container instances that are assignable, along with their corresponding computational operations, to computing resources and/or network resources. The computing resources may include computing hardware, such as processors, memory, CPUs, video cards, hard drives, RAM, ROM, etc., and/or instructions utilized to perform computing operations. Network resources may include resources of a computing network such as a bandwidth on a data communication network. The virtual workloads may utilize the computing resources and/or network resources assigned to the WM and/or container to execute its corresponding computational operations.

As such, executing virtual workloads may include executing, with available computing resources, instructions to perform computing operations. The amount, capacity, or type of computing resource to execute a virtual workload may vary with variations in the properties (e.g., size, complexity, time constraints, etc.) of the virtual workload. As described above, a virtual workload may include a VM or container and its corresponding computing tasks. For example, a virtual workload may include a particular amount of computation operations to be executed in order to provide a functionality, such as a service, associated with an application and/or a client requesting execution of the workload.

In some examples, pools of distributed computing resources such as public clouds, private clouds, and/or traditional data centers may be utilized to execute virtual workloads. For example, a portion of computing resources in a shared pool may be assigned to execution of a particular virtual workload, such as the computational operations associated with execution of instructions from an application.

Access to portions of the pool of distributed computing resources for execution of virtual workloads may be provided by virtualizing access to the physical machines, or hosts, hosting the computing resources. For example, VMs may be utilized to emulate a computing system on a host device to partition and/or provide access to the computational resources of the host device. For example, a hypervisor, or virtual machine monitor, may operate on the host device of the computing resources to emulate a particular computing system to create and run a guest operating system on the host. A plurality of VMs may operate on a same host device and each of the VMs may utilize a distinct guest operating system. Each VM may have its own binaries, libraries, and applications and/or virtual workloads that it services.

In further examples, containers may operate over the host operating system of the host device housing the computing resources. Each container may share a host operating system kernel. That is, each container may utilize the core portion of the host operating system that manages operations of the host computing system and hardware such as memory and CPU time. In some examples, the containers may share the binaries and libraries of the host operating system as well. A container may also be assigned applications and/or virtual workloads that it services.

In order to handle the computational operations assigned to a virtual workload the VM and/or containers of the virtual workload, may have a set amount of the shared pool of resources allocated to them in order to execute their respective computational operations. Virtual workloads may be assigned to computational resource and/or network resources by, for example, a cloud computing provider.

Static scale in and scale out mechanisms may be utilized to adjust computing resource allocation to virtualization instances based on various factors. For example, a configuration file for a virtualization instance may specify that ten percent of a central processing unit (CPU) capacity and ten gigabytes (GB) of memory may be assigned to the virtualization instance to execute the virtual workloads of a client. As such, the virtualization instance is pre-allocated ten percent of CPU capacity and ten GB of memory. However, at certain times (e.g., at midnight until 5 AM for a virtualization instance providing payment processing services for a brick-and-mortar retail business) execution of the corresponding virtual workload may be consuming less than the assigned capacity, resulting in an underutilization of the ten percent of CPU capacity and ten GB of memory. In such examples, static scale in and scale out mechanisms may be utilized to statically reduce the allocation of computing resources to the virtualization instance down to five percent of CPU capacity and five GB of memory from midnight until 5 AM for the virtualization instance.

Conversely, at certain times (e.g., holiday shopping days for a virtualization instance providing a payment processing service for an ecommerce chain) the virtual workload may exceed the capacity, resulting in resource starvation and a degradation of the services provided by execution of the virtual workload. Static scale in and scale out mechanisms may be utilized to statically increase the allocation of computing resources to the virtualization instance up to fifteen percent of CPU capacity and fifteen GB of memory during the holiday shopping days for the virtualization instance.

However, such static scale in and scale out mechanisms operate to impose limits that may still result in computing resource underutilization and/or starvation within and/or outside of the adjusted time windows. The static scale in and scale out mechanisms are just that, static. These mechanisms may be structured and/or utilized according to specification in a configuration file rather than being based on present conditions and/or virtual workload demands at virtualization instances. As such, the static allocation or reallocation of computing resources to particular virtualization instances may not reflect and/or may lag behind the demand for virtual workload execution at each virtualization instance.

In contrast, examples disclosed herein may be utilized to identify computing resources and/or network resources that are unutilized and/or underutilized during execution of a virtual workload and then migrating the virtual workload to those resources for execution as opposed to trying to statically assign or adjust the amount of resources assigned to a virtualization instance that will execute the virtual workload. Migration of workloads may result in a more efficient computing resource utilization reflecting present conditions in a shared resource pool and providing for substantially real-time accommodations to changes in conditions. Examples disclosed herein may include a plurality of computing resources, distributed across a plurality of hosts, to execute virtual workloads and a computing device, communicatively coupled to the plurality of hosts comprising a processing resource and a memory resource. The memory resource may store instructions executable by the processing resource to monitor utilization data of the plurality of computing resources executing assigned virtual workloads. The instructions may be executable to identify a destination host from the plurality of hosts with available computing resources based on the monitored utilization data of the plurality of computing devices. The instructions may be executable by the processing device to migrate a particular virtual workload assigned to a source host of the plurality of hosts to the destination host to be executed.

Figure 1:
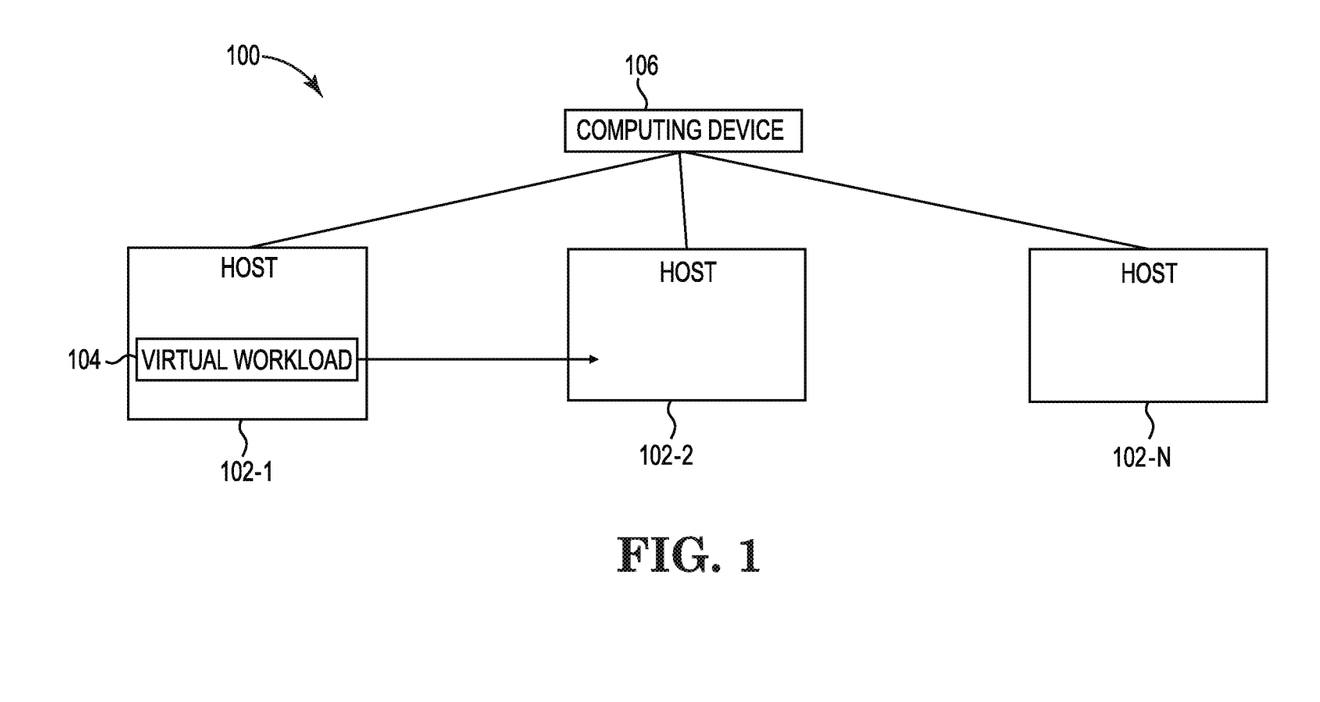
FIG. 1 illustrates a diagram of an example of a system for virtual workload migrations consistent with the disclosure.

FIG. 1 illustrates a diagram of an example of a system 100 for virtual workload migrations consistent with the present disclosure. The system 100 may include a plurality computing resources. The plurality of computing resources may include physical devices capable of executing computational operations. For example, computing resources may include processing and/or memory resources of a server or servers in a data center.

The computing resources may be located in a same or in different geographic locations. For example, the computing resources may be present in a same data center, in different data centers, etc. In examples, the computing resources may be located in different data centers located across the world from one another.

The system 100 may include network resources as well. Network resources may include bandwidth on a data communication network. The bandwidth may be allocable to particular operations, particular computing resources, particular virtual workloads, and/or particular hosts for data communication and/or processing purposes. For example, the physical computing resources described above may be communicatively coupled to a data communication network. The data communication network may have a particular amount of bandwidth utilizable to communicate data and/or process data. The particular amount of bandwidth may be divisible and/or allocable to operations or resources coupled to the data communication network.

The computing resources and network resources may be partitioned and/or assigned to the virtual workloads such as the virtual machines, containers, computes, etc. operating on devices including the computing resources. A host 102-1 . . . 102-N may include a collection of computing resources. For example, a host 102-1 . . . 102-N may include a computing device such as a server that includes a plurality of computing resources and/or network resources. Each of the hosts 102-1 . . . 102-N may provide the virtual workload 102 with access to its respective corresponding computational resources and allocated network resources. The system 100 may include a plurality of hosts 102-1 . . . 102-N corresponding to computational resources and/or network resources partitioned thereto. The hosts 102-1 . . . 102-N may be running in a same geographic location, in different geographic locations, etc.

The hosts 102-1 . . . 102-N and their corresponding computing resources and/or network resources, may be part of a shared pool of computing resources and/or network resources accessible to clients. For example, the hosts 102-1 . . . 102-N and their corresponding computing resources and/or network resource may be part of a cloud platform.

As used herein, the term "cloud platform" can, for example, be referred to broadly as a network that delivers requested virtual resources as a service. In one example, a cloud network may provide a computing environment where users can have access to applications or computing resources, as services, from anywhere through their connected devices. These services may be provided by entities called cloud services providers. Examples of services that may be provided via a cloud network include infrastructure as a service (IaaS), platform as a service (PaaS), and software as a service (SaaS). A Virtual Infrastructure Manager (VIM) may control the interaction of the VNF(s) and the compute, networking, VM inventory, and storage resources of the cloud platform. The cloud platform may include a controller to orchestrate and manage the infrastructure resources of the VIM and control the network services of the cloud platform. The hosts 102-1 . . . 102-N and their corresponding computing resources may be part of a public cloud platform, a private cloud platform, and/or a hybrid cloud platform.

As used herein, the term "public cloud platform" can, for example, refer to services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud may be a cloud storage platform which may be developed and sold as a service by a company.

As used herein, the term "private cloud platform" can, for example, refer to a cloud computing environment in which access is exclusively limited to an individual or a business entity. In one example, a private cloud may be a cloud infrastructure operated for a single individual or business entity. In one example, the private cloud is managed internally by the owner of the private cloud infrastructure. In another example, the private cloud is managed by a third-party and hosted internally or externally.

As used herein, the term "hybrid cloud platform" can, for example, refer to a cloud computing environment that comprises a number of public cloud resources and a number of private cloud resources. In one example, a hybrid cloud comprises a cloud network (or a plurality of cloud networks) such as private clouds and public clouds that remain individual networks but are associated to offer a number of services.

A virtual workload 104 may be assigned to a host 102-1 . . . 102-N for execution by the corresponding computing resources and/or with the corresponding network resources. Virtual workloads 104 may include computational operations assigned to particular hosts 102-1 . . . 102-N to be executed by their corresponding computing resources to generate a functionality for a client. The virtual workload 104 may refer to an individual computational task and/or computational tasks of a particular type originating from the client to be executed by a particular host.

The plurality of hosts 102-1 . . . 102-N may include a source host (e.g., 102-1) with regard to a particular virtual workload 104. A source host may include a host of the plurality of hosts 102-1 . . . 102-N that a virtual workload 104 is assigned to be executed under and/or is presently being executed under. That is, a source host may include a virtual instance and/or portion of computing resources and/or network resources where a virtual workload 104 is initially executed and/or initially assigned to be executed.

The system 100 may include a computing device 106 communicatively coupled to the plurality of hosts 102-1 . . . 102-N. For example, the computing device 106 may be in communication with the hosts 102-1 . . . 102-N and/or their underlying computational resources and/or host machines.

The computing device 106 may include a processing resource such as central processing units (CPUs), semiconductor-based microprocessors, and/or other hardware devices suitable for retrieval and execution of instructions stored in a memory resource (e.g., in a non-transitory computer readable medium). The processing resource may fetch, decode, and execute instructions. As an alternative, or in addition to, retrieving and executing instructions, the processing resource may include an electronic circuit (e.g., an application specific integrated circuit (ASIC)) that may include electronic components for performing the functionality of executed instructions.

In some examples, the processing resource may be a plurality of hardware processing units that may cause machine-readable instructions to be executed. The processing resource may include central processing units (CPUs) among other types of processing units. The memory resource may be any type of volatile or non-volatile memory or storage, such as random-access memory (RAM), flash memory, storage volumes, a hard disk, or a combination thereof.

The computing device 106 may include a controller. As used herein, the term "controller" can, for example, refer to a computing device that may manage and/or direct the flow of data between other computing devices. For example, a controller may direct the flow of virtual workloads between and among client devices, computing devices and/or computing resources managed by hosts 102-1 . . . 102-N, data transfer devices, etc. As such, the computing device 106 may manage the migration of virtual workloads 104 as described below.

The computing device 106 monitor utilization data of other computing devices communicatively coupled thereto. For example, the computing device 106 may monitor computing resource utilization by each of the hosts 102-1 . . . 102-N at each of a plurality of networked computing devices in a shared resource pool. Additionally, the computing device 106 may monitor network resource utilization by each of the hosts 102-1 . . . 102-N at each of the plurality of networked computing devices in a shared resource pool. Additionally, the computing device 106 may monitor computing resource and/or network resource utilization caused by an execution each of a plurality of virtual workloads. That is, the computing device 106 may determine for each virtual workload 104 an amount of computing resource and/or network resource utilization associated with its execution.

The computing device 106 may monitor computational resource and/or network resource utilization by each of the hosts 102-1 . . . 102-N over a period of time as the corresponding monitored computational resources execute their respective virtual workloads. That is, the computing device 106 may monitor utilization data for computational resources and/or network resource utilization while a shared resource pool managed by hosts 102-1 . . . 102-N is under its typical workload.

Monitoring utilization data may include monitoring the utilization of computation resources and/or network resources assigned to each host 102-1 . . . 102-N. For example, monitoring utilization data may include monitoring an amount and/or a percentage of CPU capacity being utilized by execution of a virtual workload by each host 102-1 . . . 102-N, an amount and/or percentage of a memory resource being utilized by execution of a virtual workload by each host 102-1 . . . 102-N, a data processing rate of execution of a virtual workload by each host 102-1 . . . 102-N, a delay associated with execution of a virtual workload by each host 102-1 . . . 102-N, a data traffic volume associated with execution of a virtual workload by each host 102-1 . . . 102-N, an amount of errors or dropped data associated with execution of a virtual workload by each host 102-1 . . . 102-N, an amount of bandwidth assigned to each hose 102-1 . . . 102-N, a portion of an amount of bandwidth assigned to each host 102-1 . . . 102-N consumed by execution of a virtual workload, etc.

Such utilization data may be compared against parameters for or characteristics of computing resources and/or network resources assigned to each host 102-1 . . . 102-N to identify fully utilized computing resources and/or network resources, over-burdened computing resources and/or network resources, underutilized computing resources and/or network resources, virtual workloads facing computing resource and/or network resource starvation, residual computational and/or network bandwidth capacity, etc. across the shared pool of computational resources under a load. For instance, by monitoring a CPU utilization metric determined at each host of the plurality of host devices 102-1 . . . 102-N, a host that is not able to fully execute a corresponding virtual workload 104 within a specified amount of time may be identified in addition to a host device that is not fully utilizing its allocated computing resources in fully executing its virtual workload 104 within the specified amount of time.

The utilization data may be utilized to predict a future workload at each of the host devices 102-1 . . . 102-N. For example, the utilization data may be analyzed to identify patterns that may be utilized to predict utilized and/or unutilized computational and/or network bandwidth capacity at each of the host devices 102-1 . . . 102-N. That is, in addition to identifying current and/or substantially real-time utilization data, collected utilization data may be utilized to project future utilization data.

In examples, monitoring the utilization data may include monitoring the amount of computing resource utilization and network resource utilization for a particular workload 104 and/or for each of the plurality of host device 102-1 . . . 102-N. Accordingly, monitoring the utilization data may include monitoring a computational load imposed by execution the virtual workload 104 and/or monitoring a computational load imposed by executing any other virtual workloads executing at each host of the plurality of hosts 102-1 . . . 102-N.

Based on historical and/or live or current utilization data, an amount of computing resources and/or an amount of network resources involved in executing a particular virtual workload 104 may be predicted. That is, an amount of computing resources and/or network resources of a host that would be consumed by executing the particular virtual workload 104 may be determined in advance of executing and/or assigning an execution of the virtual workload 104. Therefore, the utilization data may be utilized to predict future computing resource and/or network resource utilization to execute a future virtual workload 104. These predictions may be utilized to identify a destination host with available computing resources and network resources that match and/or exceed the predicted amount involved in executing the virtual workload 104.

The computing device 106 may identify a destination host from the plurality of hosts 102-1 . . . 102-N with available computing resources and/or network resources based on the monitored utilization data of the plurality of computing resources assigned to each of the hosts 102-1 . . . 102-N. A destination host (e.g., 102-2) may include a host of the plurality of hosts 120-1 . . . 102-N that is a candidate destination to which to migrate a virtual workload 104. The destination host may include a host that is not initially assigned to perform executions of the virtual workload 104 and/or virtual workloads of the type of from the same client as the virtual workload 104.

Available computing resources and/or network resources may include computing resources and/or network resources assigned to a host, other than a source host, that are not being utilized, are not being fully utilized, are available to be utilized, have remaining capacity that is not utilized, etc. For example, available computing resources and/or network resources may include computing resources and/or network resources that are assigned to the destination host to execute virtual workloads assigned to the destination host, but that are not being fully consumed or utilized by their assigned virtual workloads that are separate from the virtual workload 104 being considered for migration.

Identifying hosts 102-1 . . . 102-N with available computing resources and/or network resources may include utilizing historical utilization data, substantially real-time utilization data, data captured and/or interpreted during run time, and/or predictions to identify candidate destination hosts 102-1 . . . 102-N having future available computing resources and/or network resources. For example, machine learning and/or machine intelligence or artificial intelligence (AI) may be utilized at the computing device 106 to develop and employ AI predictive analytics models to transform the monitored utilization data from each of the plurality of hosts 102-1 . . . 102-N into a model and/or prediction of computational resource utilization and/or network resource utilization by each of the hosts 102-1 . . . 102-N at a specific past, present, or future time window. That is, the computing device 106 may analyze monitored utilization data to identify and/or predict trends in computational resource consumption by each of the hosts 102-1 . . . 102-N. In this manner, a computing device 106 may construct a model that may reflect current conditions and/or predict future conditions with regard to computational resource utilization and/or network resource utilization by each of the hosts 102-1 . . . 102-N. The computing resource 106 may utilize the model, created from the monitored utilization data, to identify a portion of the hosts 102-1 . . . 102-N that had, have, and/or are predicted to have available computing resources and/or network resources during specific periods of time (e.g., a time window of seconds, minutes, hours, days, months, years, seasons, event dates, etc.). The computing device 106 may adapt its models to varying conditions in the shared pool of resources rather than adhering to a static model of computational resource utilization and/or network resource utilization that may not apply during peak loads.

In the same manner, the computing device 106 may determine and/or predict computational resource utilization and/or network resource utilization at a source host for a particular virtual workload 104. The computing device 106 may determine current computational resource utilization or availability and/or predict future computational resource utilization or availability at source hosts for a particular virtual workload 104. For example, the computing device 106 may predict a computational load and/or bandwidth load that a particular virtual workload 104 will impose upon its initially assigned source host. In this manner, the computing device 106 may identify source hosts with inadequate computational resources and/or network resources to address an assigned virtual workload 104 during a specific period of time. That is, the computing resource 106 may identify or predict that a source host is assigned to execute a virtual workload 104 whose execution will exhaust or overwhelm its corresponding computational resources and/or assigned network resources.

As such, the computing device 106 may compare the virtual workload 104 to the identified available computational resources and/or network resource of candidate destination hosts. For example, the computing device 106 may compare the virtual workload 104 to the available computational resources and/or network resources identified at each of the candidate destination hosts. For example, the computing system 106 may predict a computational load or network resource load that will exist at each of the candidate destination hosts while the source host is to be executing the virtual workload 104 to identify any residual unused computational capacity at the candidate destination hosts that may exist in the future.

The computing system may compare the unused residual computing capacity and/or unused network resource capacity to the demand for computational capacity and/or network resource capacity imposed by the virtual workload 104 to a candidate destination host that is capable of executing the virtual workload 104 without disrupting other virtual workloads being executed at the candidate destination host and/or at other hosts in the shared pool of resources. Again, the destination host may be in a same datacenter, a different data center, across a cloud, etc.

The computing device 106 may select a destination host to which to migrate the virtual workload 104 of the source host. Additionally, the computing device 106 may identify any ancillary migrations of other workloads from their source hosts to destination hosts that may be executed in order to migrate the virtual workload 104 without creating ripple disruptions throughout the shared resource pool.

The computing device 106 may migrate the particular virtual workload 104, assigned to the source host, to the identified destination host for execution by the computational resources and/or the network resources corresponding to the destination host. Migrating the virtual workload 104 may include designating a plurality of migration parameters. For example, the computing device 106 may designate the source host, the virtual workload 104, the destination host, the time of migration, the amount, timing, and other specifications of the computational resources and/or network resource of the destination host to be applied to executing the virtual workload 104 from the source host. Additionally, the computing device 106 may designate migration parameters for the ancillary migrations.

In migrating the particular virtual workload 104 from the source host to the destination host, the computing device 106 may deliver and/or cause the delivery of instructions for execution of the computing operations of the migrating virtual workload 104 to the destination host for execution. The computing device 106 may migrate other virtual workloads from their respective source hosts to respective destination hosts to address ancillary virtual workload migrations precipitated by the migration of the virtual workload 104 (e.g., workload migrations involved in shifting allocations among hosts to make room for a migrated workload without causing disruption of other workloads or overloading a host).

The migrated virtual workload 104 may be executed at the destination host by its corresponding computing resources and/or by utilizing the its corresponding assigned network resources. The migrated virtual workload 104 may be executed at the destination host while its computational resources and/or network resources are simultaneously utilized to execute virtual workloads that were initially assigned to the destination host. That is, the virtual workload 104 may be executed at the destination host while the destination host's computational resources and/or network resources are simultaneously utilized to execute virtual workloads for which the destination host serves as a source host.

Figure 2A:
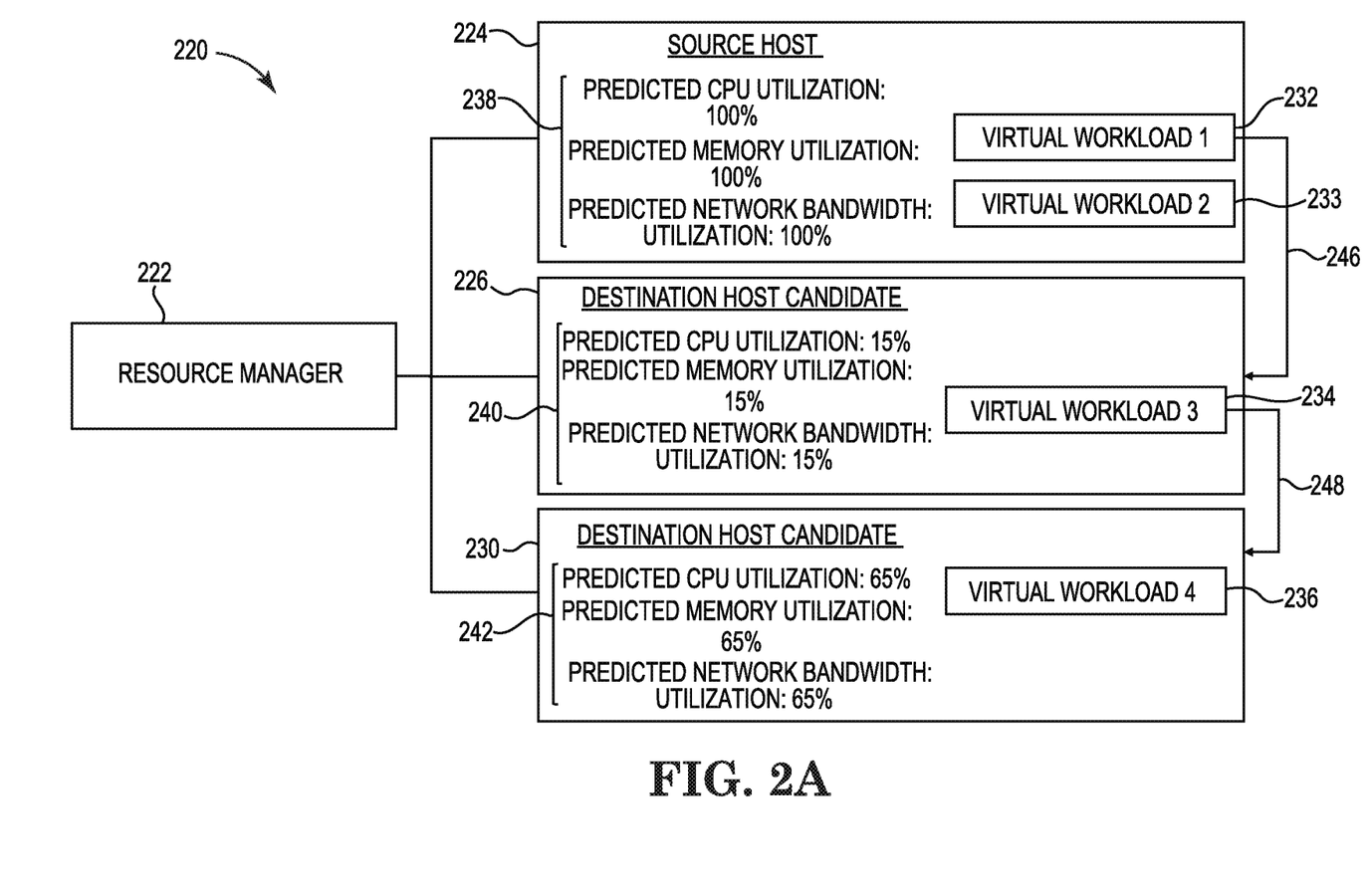
FIG. 2A illustrates a diagram of an example of an environment consistent with the disclosure.
Figure 2B:
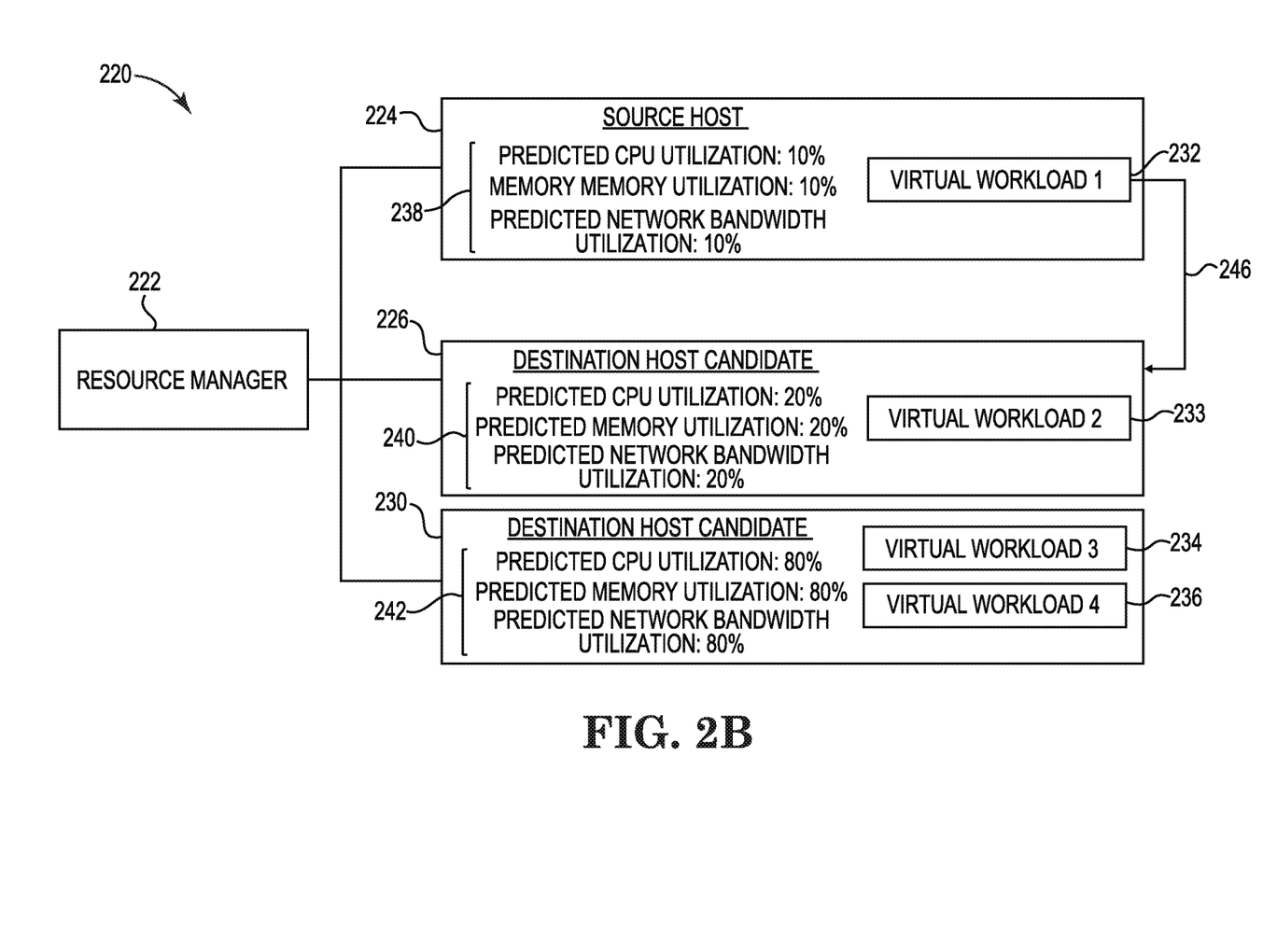
FIG. 2B illustrates a diagram of an example of an environment consistent with the disclosure.

FIGS. 2A and 2B illustrate a diagram of an examples of an environment 220 for virtual workload migrations consistent with the present disclosure. The environment 220 may include a resource manager 222. A resource manager may include a processing resource with access to a memory resource. The memory resource may store instructions executable by the processing resource to perform functionalities such as virtual workload migrations. The resource manager may include and/or be in communication with a controller of a cloud computing platform.

The resource manager 222 may be communicatively couple to and/or in communication with a controller communicatively coupled to a plurality of hosts 224, 226, 230. The hosts 224, 226, 230 may be virtualization instances running over and/or managing computational resources and/or network resources of a shared resource pool. The computational resources may be distributed. For example, the computational resources may be distributed across a rack in a data center, across a data center, across multiple data centers, etc.

The resource manager 222 may collect and/or receive (e.g., from a controller) utilization data for each of the hosts 224, 226, 230 from a monitoring agent. For example, a monitoring agent such as monasca or ceilometer, may provide data to the resource manager 222 regarding utilization of computing resources and/or network resources at each of the hosts 224, 226, 230. This data may reveal the amount of computing resources and/or network resources available at each of the hosts 224, 226, 230. The data may reveal the computing resources and/or network resources that are involved in executing each virtual workload 232, 233, 234, and 236, in addition to revealing computing resources and/or network resources being utilized and/or unutilized at each host as it executes its corresponding virtual workload 232, 233, 234, 236. The resource manager 222 may store the utilization data in a data structure such as a database. The resource manager 222 may analyze the stored utilization data from the structure. The resource manager 222 may identify patterns occurring in the utilization data. For example, the resource manager 222 may correlated times of the day or days of the year with virtual workload fluctuation for each of the hosts 224, 226, 230. Patterns may emerge that are time based (e.g., a payment processing virtual workload for an e-commerce website increases from 9 AM to 5 PM) and/or geo-location based (e.g., a payment processing virtual workload for an e-commerce website based in the United States increases during the two weeks preceding the Christmas Holiday).

The resource manager 222 may utilize the patterns to predict utilization loads 238, 240, 242 of computing resources and/or network resources corresponding to each of the hosts 224, 226, 230 during a specific period of time. For example, the resource manager 222 may utilize the patterns to predict an amount of the computing resources and/or network resources that would be utilized in executing a virtual workload 232, 233, 234, 236 at a future time. Additionally, the resource manager 222 may utilize the patterns to predict an amount and/or portion of the computing resources and/or network resources of each host 224, 226, 230 that may be utilized and/or unutilized at each host as it executes a corresponding virtual workload 232, 233, 234, 236 at the future time.

For example, the resource manager 222 may utilize the patterns to predict that during a future eight-hour time period, the first virtual workload 232 is going to spike to 80% predicted CPU utilization, 80% predicted memory utilization, and/or 80% predicted network bandwidth utilization. The resource manager 222 may utilize the patterns to predict that, during that same eight-hour time period, the second virtual workload 233 will remain at 20% predicted CPU utilization, 20% predicted memory utilization, and/or 20% predicted network bandwidth utilization. As such, the resource manager 222 may utilize the patterns to predict that the load imposed on the source host 224 by execution of its assigned virtual workloads 232 and 233 during the eight-hour timer period will be 100% of its assigned CPU utilization capacity, 100% of its assigned memory resource utilization capacity, and/or 100% of its assigned bandwidth capacity. Any predicted load over 80% of the capacity of the computing resources and/or network resources of a host may trigger a migration to alleviate the burden on the host.

Further, the resource manager 222 may utilize the patterns to predict that the load imposed on a first destination host candidate 226 by execution of its assigned virtual workload 234 during the same eight-hour period of time will be 15% of its assigned CPU utilization capacity, 15% of its assigned memory resource utilization capacity, and/or 15% of its assigned network bandwidth capacity. Furthermore, the resource manager 222 may utilize the patterns to predict that the load imposed on a second destination host candidate 230 by execution of its assigned virtual workload 236 during the same eight-hour period of time will be 65% of its assigned CPU utilization capacity, 65% of its assigned memory resource utilization capacity, and/or 65% of its assigned bandwidth capacity.

The resource manager 222 may utilize the predictions and/or revisions to the predictions, produced by analysis of substantially real-time data, to identify one or more destination host candidates 226 230 that have, independently or in combination, unutilized assigned computational capacity and/or network resource capacity that can accommodate the virtual workload 232 that exceeds the capacity limits on the computational capacity and/or network resource capacity of the source host 224 to execute within a period of time. The resource manager 222 may identify migration parameters for each virtual workload migration 246 248 to be accomplished in order to migrate a virtual workload 232 from the source host 224 to a selected destination host candidate 226.

For example, as illustrated in FIG. 2A, the resource manager 222 may identify that the first virtual workload 232 assigned to the source host 224 spiking to 80% predicted CPU utilization, 80% predicted memory utilization, and/or 80% predicted network bandwidth utilization causes the predicted utilization of computational resources and/or the network resources of the source host 224 to exceed the 80% cap. The resource manager 222 may identify that migration of the first virtual workload 232 to a first destination host candidate 226 would result in 95% predicted CPU utilization, 95% predicted memory utilization, and/or 95% predicted network bandwidth utilization, also violating the 80% cap. In addition, the resource manager 222 may identify that the second destination host candidate 230 does not have available computational and/or network resource capacity to accommodate the migration of the first virtual workload 232.

However, the resource manager 222 may predict that if the third virtual workload 234 were migrated from the first destination host candidate 226 to the second destination host candidate 230 the result would be a second destination host candidate 230 executing both the third virtual workload 234 and the fourth virtual workload 236 and utilizing 80% predicted CPU utilization, 80% predicted memory utilization, and/or 80% predicted network bandwidth utilization, which is under the 80% cap. Additionally, such a migration would free the first destination host 226 from its third workload 234 rendering it able to accommodate the first virtual workload 232 from the source host 224. As such, the resource manager 222 may predict that the first virtual workload 232 may be migrated from its source host 224 to the newly cleared first destination host candidate 226 where it will utilize 80% predicted CPU utilization, 80% predicted memory utilization, and/or 80% predicted network bandwidth utilization.

As such, resource manager 222 may create migration parameters for a migration 246 of the first virtual workload 232 from its source host 224 to a first destination host candidate 226 for execution by the computational resources and/or network resources assigned to the first destination host candidate 226. The migration parameters may specify a first migration 246 of the virtual workload 232 from the source host 224 to the first destination host candidate 226. However, the migration parameters may also specify an ancillary or second migration 248. For example, the migration parameters may specify a migration 248 of the third virtual workload 234 to the second destination host candidate 230 for execution by the computational resources and/or network resources assigned to the second destination host 226. The second migration 248 may occur temporally before the first migration 246 in order to clear enough capacity of the computational resources and/or network resources assigned to the second destination host candidate 226 to accommodate execution of the entire virtual workload 232 by the computational resources and/or network resources assigned to the first destination host candidate 226.

The resource manager 222 may migrate 248 the third virtual workload 234 assignment from the first destination host candidate 226 (in this case, the source host for the third virtual workload 234) to the second destination host candidate 230. Accordingly, the computational resources and/or network resources of the second destination host candidate 230 may be utilized at 80% capacity in executing the third virtual workload 234 and the fourth virtual workload 236. This migration 248 may leave the first destination host candidate 226 with 100% of the capacity of its computational resources and/or network resources potentially unutilized. The resource manager 222 may migrate the first virtual workload 232 assignment from its source host 224 to the first destination host candidate 226 to be executed by this unutilized capacity.

In another example, as illustrated in FIG. 2B, the resource manager 222 may determine that executing the first virtual workload 232 may involve 10% predicted CPU utilization, 10% predicted memory utilization, and/or 10% predicted network bandwidth utilization for a future eight-hour period. The first virtual workload may be the only workload tentatively assigned to a first source host 224 during that period meaning that executing the first workload would be predicted to produce a load of 10% predicted CPU utilization, 10% predicted memory utilization, and/or 10% predicted network bandwidth utilization on the source host 224 for the eight-hour hour period. Workloads below twenty-percent may trigger the resource manager 222 to identify potential migrations to ameliorate underutilization and/or reduce energy consumption.

In such examples, the resource manager 222 may identify that a migration 246 of the first virtual workload 232 to a first destination host candidate 226 would result in 30% predicted CPU utilization, 30% predicted memory utilization, and/or 30% predicted network bandwidth utilization at the first destination host candidate 226 during the eight-hour period. Additionally, the resource manager 222 may identify that the migration 246 would free the source host 224 from any workload assignments thereby freeing the source host 224 to be powered down and/or powered off to conserve electricity.

As such, resource manager 222 may create migration parameters for a migration 246 of the first virtual workload 232 from its source host 224 to a first destination host candidate 226 for execution by the computational resources and/or network resources assigned to the first destination host candidate 226. The migration parameters may specify a first migration 246 of the virtual workload 232 from the source host 224 to the first destination host candidate 226. The migration parameters may also specify that the source host 224 should be placed in a powered down state and/or the host's 224 computational resources and/or network resources should be added to a reserve following the migration 246.

The resource manager 222 may migrate 246 the first virtual workload 232 assignment from the source host 224 to the first destination host candidate 226. Accordingly, the source host 224 may be powered down and/or its computational resources and/or network resources may be placed in a reserve following the migration 246. As such, not only are all virtual workloads 232, 233, 234, 236 in a shared pool executed without delay, but overall power consumption for a shared pool of resources may be reduced in the process.

As soon as the load imposed by any of the virtual workloads 232, 233, 234, 236 changes, new migration parameters may be determined, and a redistribution of the load may be accomplished across the hosts 224, 226, 230 using a different migration strategy. That is, as opposed to statically reallocating computational resources to hosts in order to meet demands of a virtual workload that may fluctuate, the resource manager 222 may recognize and/or predict these fluctuations and adapt to the workload fluctuations by fluidly migrating the workload among hosts.

Figure 3:
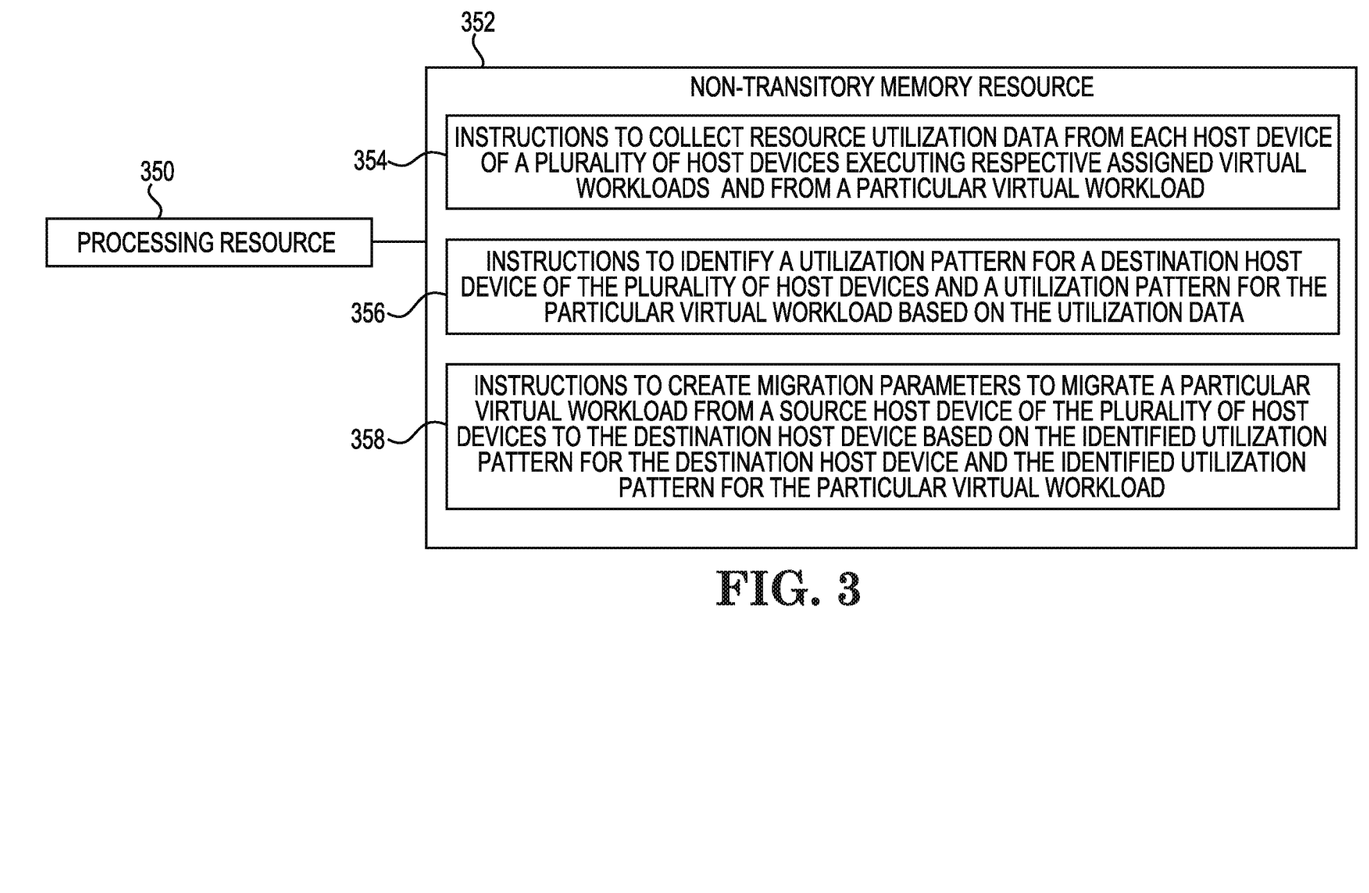
FIG. 3 illustrates an example of a non-transitory machine-readable memory resource and processing resource for virtual workload migrations consistent with the disclosure.

FIG. 3 illustrates an example of a non-transitory machine-readable memory resource and processing resource for virtual workload migrations consistent with the disclosure. The processing resource 350, and the non-transitory memory resource 352, illustrated in FIG. 3 may be analogous to the elements illustrated in FIGS. 1, 2A, and 2B. A memory resource, such as the non-transitory memory resource 352, may be used to store instructions (e.g., 354, 356, 358, etc.) executed by the processing resource 350 to perform the operations as described herein. The operations are not limited to a particular example described herein and may include additional operations such as those described with regard to the system 100, the environment 220, and the method 480 described in connection with FIGS. 1, 2A, 2B, and 3.

The non-transitory memory resource 352 may store instructions 354 executable by the processing resource 350 to collect utilization data of the computing resources and/or network resources from each host device of the plurality of host devices in a shared resource pool. The host devices may include virtualization instances such as a VM or a container operating over assigned computing resources from the shared resource pool.

Utilization data may be collected from each of the plurality of host devices while they utilize their computing resources and/or network resources to execute respective assigned virtual workloads. The utilization data may be collected by a monitoring agent. The utilization data may be compiled and/or saved for further analysis.

Additionally, utilization data may be collected from various workloads executed in a shared resource pool. For example, utilization data for a particular virtual workload executing on a particular host in a shared resource pool may be collected. For example, the amount of computing resources and/or network resources consumed by execution of the particular virtual workload may be collected.

As such, the collected utilization data may include data cataloging the computing resource and/or network resource utilization associated with each host device in a shared pool in addition to the computing resource and/or network resource utilization associated with each virtual workload executed within the shared resource pool. The utilization data may provide an understanding of the resources available, the distribution of those available resources, and the demand for resources imposed by each virtual workload.

The non-transitory memory resource 352 may store instructions 356 executable by the processing resource 350 to identify a utilization pattern for each of a plurality of hosts in a shared resource pool. For example, a utilization pattern for a source device of the plurality of hosts may be identified based on the utilization data for the source device. A utilization pattern for a destination host device of the plurality of host devices may be identified based on the utilization data for the host device.

For example, a pattern of computational resource utilization and/or network resource utilization at each of the hosts may be identified from historical utilization data at each of the host devices and/or from live utilization data at each of the hosts. The pattern may be identified based on utilization data corresponding to a geo-location of the destination host device. For example, the pattern identified for a host may be informed by the geo-location of the computational resources and/or network resources or infrastructure of the host. For example, if the computational resources or network resources are located in the United States and/or service a retailer in the United States, an increased virtual workload may be predicted around the Christmas Holiday. Whereas, if the computational resources are located in India and/or service a retailer in India, an increased virtual workload may be predicted around the Diwali Holiday. Additionally, the pattern may be identified based on utilization data corresponding to a period of time that the portion of the workload is executable by the destination host device. For example, an increased virtual workload for payment processing for a business may be predicted during business hours.

Additionally, a utilization pattern for each of a plurality of workloads in a shared resource pool may be identified from the utilization data. The utilization pattern for a particular virtual workload may be utilized to predict a computational load that will be imposed to complete an execution of a particular virtual workload. For example, the utilization data collected from execution of a particular virtual workload over a period of time may be utilized to project or predict the computational resource and/or network resource consumption that will be involved in future executions of the virtual workload.

As described above, the utilization pattern for the source host device may be utilized to predict an availability of computational resources and/or network resources at the source host device to execute the particular virtual workload. The utilization pattern for the source host device may be utilized to predict an amount of computational resources and/or an amount of network resource, to execute the particular virtual workload at a future time period.

The utilization pattern for a destination host may be utilized to predict an amount of computational resources and/or network resources available at the destination host device to execute the particular virtual workload at the future time period. A determination may be made as to whether the destination host device is compatible with the particular virtual workload based on the amount of computational resources and/or network resources predicted to be involved in executing the particular virtual workload at the future time period as compared to the predicted amount of computational resources and/or network resources predicted to be available at the destination host device at the future time period.

The non-transitory memory resource 352 may store instructions 358 executable by the processing resource 350 to create migration parameters to migrate the particular virtual workload. For example, migration parameters may be created that specify a migration of the virtual workload from a source host device of a plurality of host devices to a destination host device. The migration patterns may be created based on the identified utilization patterns for the destination host device and the identified utilization patterns of the particular virtual workload.

The virtual workload may be migrated to the destination host. The migrated virtual workload may be executed utilizing the computing resources and/or network resources of the destination host device. In some examples, the destination host may simultaneously execute its assigned virtual workload along with the migrated virtual workload.

Figure 4:
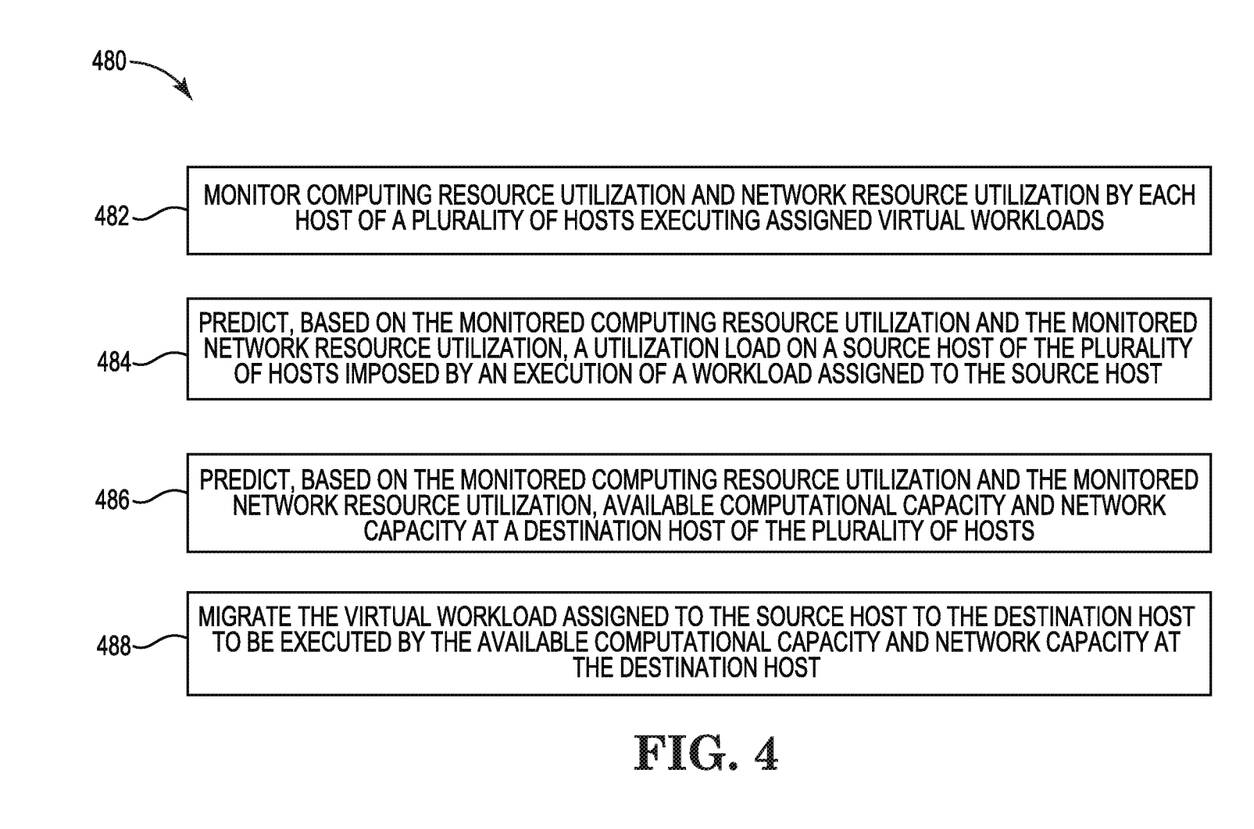
FIG. 4 illustrates a diagram of an example of a method for virtual workload migrations consistent with the disclosure.

FIG. 4 illustrates an example of a method 480 for virtual workload migrations consistent with the disclosure. At 482, the method 480 may include monitoring computing resource utilization. For example, the computing resource utilization by each host of a plurality of hosts executing assigned virtual workloads may be monitored. Monitoring computing resource utilization may include monitoring the amount of a total capacity of the computational resources and/or network resources assigned to each host that is consumed by executing the virtual workload assigned to the host over a period of time.

The monitored computing resource utilization may be analyzed to identify utilization patterns. For example, computing resource utilization and/or network resource utilization may be analyzed to determine dates and times correlated with fluctuations in computing resource utilization and/or network resource utilization at each of the hosts. The patterns may be utilized to formulate predictions regarding computing resource utilization and/or network resource utilization at each of the hosts during various period of time.

For example, at 484, the method 480 may include predicting, based on the monitored computing resource utilization and the monitored network resource utilization, a utilization load on a source host of the plurality of hosts. The predicted utilization load may include a predicted amount of a computational capacity and/or network resource capacity of a host that will be consumed by an execution of a workload assigned to the source host. The prediction may be based on the historic monitored computing resource and/or network resource utilization and/or by actual substantially real-time computing resource and/or network resource utilization measured during run time.

At 486, the method 480 may include predicting, based on the monitored computing resource utilization and/or network resource utilization, an available computational capacity and/or network resource capacity at a destination host of the plurality of hosts. The available computational capacity and/or available network resource capacity may be the portion of a computational capacity and/or a network resource capacity assigned to a destination host that is not being used during execution of its assigned virtual workload. That is, the available computational capacity and/or available network resource capacity may be the portion of the computational capacity and/or network resource capacity assigned to a destination host that is available to execute a different virtual workload.

The predicted available computational capacity and/or network resource capacity at the destination host may be compared to the predicted utilization load on the source host imposed by execution of its virtual workload. The comparison may be used to determine whether the predicted available computational capacity and/or the predicted available network resource capacity at the destination host may accommodate an execution of the virtual workload initially assigned to the source host. If the predicted available computational capacity and/or available network resource capacity of the destination host is equal to or exceeds a predicted computational capacity and/or a predicted network resource capacity in addition to the computational capacity and/or network resource capacity of the source host that would be utilized for fully executing the virtual workload, then the destination host may be determined to be able to accommodate a migration of the virtual workload from the source host to the destination host.

At 488, the method 480 may include migrating the virtual workload assigned to the source host. For example, the virtual workload may be migrated from its source host to the destination host to be executed by the available computational capacity and/or the available network resource capacity at the destination host. Migrating the virtual workload to the host destination device may include executing the virtual workload with the available computational capacity and/or the available network resource capacity at the destination host.

Additionally, a second workload assigned to the destination host may be executed at the destination host. For example, the second workload may be executed by the destination host simultaneous with execution of the migrated virtual workload by the destination host.

In some examples, a carbon footprint associated with an execution of a virtual workload at each of a plurality of destination hosts may be determined. For example, an amount of electricity, a source of that electricity, etc. involved in powering the computational resources of each of the destination hosts may be determined. A destination host to migrate the virtual workload to may be selected based on the carbon footprint. For example, a carbon footprint associated with an execution of the virtual workload at the source host and a carbon footprint associated with an execution of the virtual workload at the destination host may be determined. A determination may be made that migrating the virtual workload to the destination host and powering down the source host may result in a relatively smaller carbon footprint with no disruption to the execution of the virtual workload or any other virtual workload in a shared resource pool. As such, the virtual workload may be migrated to the destination host and the source host may be powered down to save electricity. That is, the virtual workload may be migrated to the destination host and the source host may be shut down, based on the carbon footprint associated with the execution of the virtual workload at the destination host being less than the carbon footprint associated with the execution of the virtual workload at the source host.

In some examples, it may be identified that that load on a particular host is relatively low and/or below a load threshold. For example, it may be determined that a particular host is executing fewer than a threshold number of virtual workloads. For example, hosts that are being utilized at less than 20% of their computational and/or network resource capacity may be identified as underutilized and become candidates for a migration that may lead to reducing power consumption by shutting down the underutilized hosts. In such examples, it may be determined that the particular host may be emptied of its remaining workloads utilizing the migration systems described above in order that the host machine may be shut down to save electric power and/or energy.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system comprising:
a plurality of computing resources, distributed across a plurality of hosts, to execute virtual workloads; and a computing device, communicatively coupled to the plurality of hosts, comprising a processing resource and a memory resource to store instructions executable by the processing resource to:
- monitor utilization data, over a period of time, of the plurality of computing resources executing assigned respective virtual workloads;
- predict a destination host from the plurality of hosts with available computing resources in an amount to accommodate a predicted resource utilization of a first virtual workload based on the monitored utilization data of the plurality of computing resources;
- create a plurality of migration parameters to migrate the first virtual workload, wherein the plurality of migration parameters include one or more ancillary migrations implemented to facilitate migration of the first virtual workload, wherein
  - the ancillary migrations include migration of a second workload from the destination host to a second destination host prior to migration of the first workload to the destination host, the second migration creating room at the destination host for facilitating migration of the first workload to the destination host
- migrate the first virtual workload assigned to a source host of the plurality of hosts to the destination host based on the plurality of migration parameters, wherein a geo-location and events associated with the geo-location of the predicted destination host are evaluated;
- power down the source host following the migration if no other workloads are executing on the source host; and
- add resources of the source host to a reserve for subsequent utilization.

2. The system of claim 1, wherein the utilization data of the plurality computing resources includes a memory utilization metric determined at each host of the plurality of hosts.

3. The system of claim 1, wherein the utilization data of the plurality computing resources includes an amount of containers operating and the computational load imposed by the amount of containers operating at each host of the plurality of hosts.

4. The system of claim 1, wherein the computing device includes instructions executable by the processing resource to predict a computational load at the source host when the first virtual workload is to be executed and to trigger the instructions to migrate based on the computational load exceeding a threshold.

5. The system of claim 1, wherein the computing device includes instructions executable by the processing resource to predict the available computing resources based on a computational load predicted to be imposed upon the destination host by other virtual workloads when the first workload is to be executed.

6. The system of claim 1, wherein the utilization data of the plurality of computing resources includes a network bandwidth utilization metric determined at each host of the plurality of hosts.

7. The system of claim 1 wherein the instructions are further executable to: compare the utilization data with a pre-determined threshold to determine an over-utilization or an under-utilization of resources associated with a host wherein the resources include a computing capacity, a memory capacity or a network bandwidth capacity.

8. The system of claim 1, wherein the events associated with the geo-location of the destination host include annual events having a corresponding increased demand on virtual workload.

9. A non-transitory machine-readable storage medium having stored thereon machine-readable instructions to cause a computer processor to:
- collect resource utilization data from each host device of a plurality of host devices executing respective assigned virtual workloads and from a first virtual workload;
- identify a utilization pattern for a destination host device of the plurality of host devices and a utilization pattern for the first virtual workload based on the utilization data, the utilization pattern for the destination host device being identified based on including utilization data corresponding to a geo-location of the destination host device including events associated with the geo-location;
- create migration parameters to migrate the first virtual workload from a source host device of the plurality of host devices to the destination host device based on the identified utilization pattern for the destination host device and the identified utilization pattern for the first virtual workload, wherein
  - the plurality of migration parameters include one or more ancillary migrations implemented to facilitate migration of the first virtual workload, and
  - the ancillary migrations including migration of a second workload from the destination host to a second destination host prior to migration of the first workload to the destination host, the second migration creating room at the destination host for facilitating migration of the first workload to the destination host;
- migrate the virtual workload assigned to the source host to the destination host to be executed by the available computational capacity and network capacity at the destination host;
- power down the source host following the migration if no other workloads are executing on the source host; and
- add resources of the source host to a reserve for subsequent utilization.

10. The medium of claim 9, wherein the instructions to identify the utilization pattern for the destination host device based on the utilization data includes instructions to identify the utilization patterns from historical utilization data and live utilization data.

11. The medium of claim 9, wherein the utilization pattern for the destination host device is identified based on utilization data corresponding to a period of time that the workload is to be executed by the destination host device.

12. The medium of claim 9, including instructions to:
- predict, from the utilization pattern for the first virtual workload, a resource utilization imposed to execute the first virtual workload;
- predict, from the utilization pattern for the source host device, an availability of computing resources and network resources at the source host device to execute the first virtual workload.

13. The medium of claim 12, including instructions to:
- predict, based on the utilization pattern for the destination host device, an amount of computing resources and network resources available at the destination host device to execute the first virtual workload; and
- determine whether the destination host device is compatible with the first virtual workload based on the predicted resource utilization to execute the first virtual workload and the predicted amount of computing resources and network resources available at the destination host device when the first virtual workload is to be executed.

14. The medium of claim 9, wherein the destination host device is in a different data center than the source host device.

15. The method of claim 9, wherein the events associated with the geo-location of the destination host include annual events having a corresponding increased demand on virtual workload.

16. A method, comprising:
- monitoring computing resource utilization and network resource utilization by each host of a plurality of hosts executing assigned virtual workloads;
- predicting, based on the monitored computing resource utilization and the monitored network resource utilization, a utilization load on a source host of the plurality of hosts imposed by an execution of a workload assigned to the source host;
- predicting, based on the monitored computing resource utilization and the monitored network resource utilization, available computational capacity and network capacity at a destination host of the plurality of hosts, including evaluating a geo-location of the destination host and events associated with the geo-location;
- creating a plurality of migration parameters to migrate a virtual workload, wherein the plurality of migration parameters include one or more ancillary migrations implemented to facilitate migration of the virtual workload, wherein
   - the ancillary migrations include migration of a second workload from the destination host to a second destination host prior to migration of the first workload to the destination host, the second migration creating room at the destination host for facilitating migration of the first workload to the destination host;
- migrating the virtual workload assigned to the source host to the destination host to be executed by the available computational capacity and network capacity at the destination host;
- determining whether the available computational capacity and network capacity at the destination host accommodates an execution of the virtual workload;
- powering down the source host, based on the carbon footprint associated with the execution of the virtual workload at the destination host being less than the carbon footprint associated with the execution of the virtual workload at the source host; and
- adding resources of the source host to a reserve for subsequent utilization.

17. The method of claim 16, including executing a second workload assigned to the destination host at the destination host when simultaneously executing the virtual workload migrated to the destination host from the source host.

18. The method of claim 16, including determining whether the available computational capacity and network capacity at the destination host accommodates an execution of the virtual workload.

19. The medium of claim 16, wherein the events associated with the geo-location of the destination host include annual events having a corresponding increased demand on virtual workload.

* * * * *